(12) United States Patent
LaRoche (10) Patent No.: US 7,441,653 B2
(45) Date of Patent: Oct. 28, 2008

(54) PACKAGE FOR A DISC-SHAPED DIGITAL RECORDING MEDIUM

(75) Inventor: Francis LaRoche, Soy Aux (FR)

(73) Assignee: Moulage Industrial de Perseigne (MIP) (FR)

( * ) Notice: Subject to any disclaimer, the term of this patent is extended or adjusted under 35 U.S.C. 154(b) by 135 days.

(21) Appl. No.: 10/533,887

(22) PCT Filed: Nov. 5, 2003

(86) PCT No.: PCT/FR03/03308

§ 371 (c)(1),
(2), (4) Date: Jul. 14, 2005

(87) PCT Pub. No.: WO2004/042728

PCT Pub. Date: May 21, 2004

(65) Prior Publication Data

US 2006/0026605 A1    Feb. 2, 2006

(30) Foreign Application Priority Data

Nov. 5, 2002  (FR) .................................. 02 13840
Feb. 13, 2003 (FR) .................................. 03 01752

(51) Int. Cl.
*B65D 85/57* (2006.01)
(52) U.S. Cl. .................................... 206/308.1; 206/303
(58) Field of Classification Search ............. 206/308.1, 206/310, 309, 303
See application file for complete search history.

(56) References Cited

U.S. PATENT DOCUMENTS

| 2,691,440 | A | * | 10/1954 | Spugios et al. | ............... 206/312 |
| 4,771,890 | A | * | 9/1988 | Hofland et al. | ........... 206/308.1 |
| 4,773,061 | A | | 9/1988 | Stark et al. | |
| 5,533,615 | A | * | 7/1996 | McCamy | .................. 206/308.1 |
| 5,690,218 | A | * | 11/1997 | McCamy et al. | .......... 206/308.1 |
| 5,749,463 | A | * | 5/1998 | Collins | ..................... 206/308.1 |
| 6,044,969 | A | * | 4/2000 | Denize et al. | ............ 206/308.1 |
| 6,170,658 | B1 | * | 1/2001 | Dering | .................... 206/308.1 |
| 6,443,300 | B1 | | 9/2002 | Gelardi | |
| 6,837,370 | B2 | * | 1/2005 | Shindo et al. | ............ 206/308.1 |
| 2002/0020643 | A1 | * | 2/2002 | Kleine-Moellhoff | ..... 206/308.1 |
| 2002/0154597 | A1 | * | 10/2002 | Chan et al. | ............... 206/308.1 |
| 2003/0126839 | A1 | * | 7/2003 | Hoogland | ............... 206/308.1 |

FOREIGN PATENT DOCUMENTS

| FR | 2 730 087 A3 | 8/1996 |
| FR | 2 810 442 A1 | 12/2001 |
| JP | 09 301470 A | 11/1997 |
| JP | 10 310184 A | 11/1998 |
| JP | 2001 171773 A | 6/2001 |

* cited by examiner

*Primary Examiner*—Bryon P Gehman
(74) *Attorney, Agent, or Firm*—DLA Piper LLP (US)

(57) ABSTRACT

A package for a digital recording support in the form of a disk formed by a plate with a disk centering piece, wherein the plate comprises at least two radial shoulders defined to cover, when at rest, a marginal zone of the disk and define with the bottom of the plate a slot with a height approximately equal to the thickness of the disk.

14 Claims, 13 Drawing Sheets

PACKAGE FOR A DISC-SHAPED DIGITAL RECORDING MEDIUM

RELATED APPLICATION

This is a §371 of International Application No. PCT/FR2003/003308, with an international filing date of Nov. 5, 2003 (WO 2004/042728 A1, published May 21, 2004), which is based on French Patent Application Nos. 02/13840, filed Nov. 5, 2002, and 03/01752, filed Feb. 13, 2003.

TECHNICAL FIELD

This disclosure relates to packages for digital recording supports in the form of a disk such as CD's, DVD's, mini CD's and the like.

BACKGROUND

The general principle of packages comprising a centering stud on which the disk is to be clipped is known. The centering studs generally have several deformable petals. They are formed either by molding the bottom of a package consisting of plastic or are in the form of a piece adhered on a cardboard support.

By way of example, FR2810442 describes a case for DVD's, CD's or VCD's constituted of a body, a cover, a molded hinge mechanism and comprising an annular projecting element. The projecting element extends upward from the body to support a disk. This projecting element is formed by a protuberant collar with flexible wings that lodge in the centering hole of a disk. These petals are fragile and brittle and can break during transport or the placing or removing of the disk. The broken petals then move between the package and the disk and can scratch the disk surface.

The cost of manufacturing such a case is high because the projecting element must be molded in a complex mold with rather low manufacturing tolerances. These petals are generally sensitive to temperature and do not always ensure an effective holding of the disk.

Moreover, when the collar is adhered to the bottom of the case they can tear off and be swallowed by a child.

FR 2730087 also discloses a flexible plastic case bottom having three pins raised vertically relative to the bottom. The disk is wedged between these pins. This solution is not very satisfactory because the disk is not correctly held. In addition, the pins rapidly wear out.

U.S. Pat. No. 6,443,300 describes a disk case comprising in particular a base with a cavity for receiving one or several disks and disk retention feet connected to the base. The feet, that extend over the peripheral parts of one or several disks arranged in the cavity and hold the disk or disks in the cavity (closed position), can be moved toward a release position in such a manner as to permit the removal of the disk or disks from the cavity.

However, such a case has disadvantages. In fact, the release of the disk or disks requires a manual intervention directly on the retention feet, thus increasing the risk of scratching by the user when the feet are moved toward their release position. Moreover, the operation consisting of moving the feet toward their release position is not very practical. In fact, this operation requires either a successive release action on each of the feet or the use of both hands of the user for the simultaneous opening of two feet.

SUMMARY

I provide a package for a digital recording support in the form of a disk formed by a plate with a disk centering piece, wherein the plate includes at least two radial shoulders defined to cover, when at rest, a marginal zone of the disk and define with the bottom of the plate a slot with a height approximately equal to the thickness of the disk.

BRIEF DESCRIPTION OF THE DRAWINGS

The invention will be better understood from a reading of the following description that refers to the attached drawings concerning non-limiting exemplary embodiments in which.

It will be appreciated that the following description is intended to refer to specific structures selected for illustration in the drawings and is not intended to define or limit these structures, other than in the appended claims.

I provide a general sense to a package for a digital recording support in the form of a disk formed by a plate with means for centering the disk, characterized in that the plate comprises at least two radial shoulders arranged on both sides of a median line for positioning the disk, which radial shoulders are defined so as to cover when at rest a marginal zone of the disk and to define with the bottom of the plate a slot with a height approximately equal to the disk thickness.

The plate preferably has a cylindrical cavity for receiving a disk, which cavity advantageously has a diameter slightly greater than the diameter of said disk and preferably on the order of 4 to 5%.

The cavity may have an oval or ellipsoidal shape with a small axis corresponding approximately to the diameter of the disk to be inserted on the plate and a large axis slightly greater than the diameter of the disk. The term "slightly" means that the dimensional difference is sufficient to permit a movement along the large axis to permit insertion into the cavity while ensuring the hold by the radial shoulders when the disk is at rest in the position of insertion into the cavity.

This cylindrical cavity advantageously has a depth on an annular peripheral band that corresponds approximately to the disk thickness.

The plate may have at least one elastically deformable stop preferentially arranged on the periphery of the cavity.

It is advantageous if at least one of the stops is arranged at the level of one of the slots formed by one of the shoulders and the bottom of the plate. According to a particular configuration at least one of the stops is supported by one of the shoulders.

It is advantageous if at least one of the stops comprises at least one foot with approximately rectangular dimensions and preferably with a slightly decreasing width between its ends and its central part.

The foot advantageously has a convex shape directed toward the cylindrical cavity.

The cylindrical cavity may be prolonged from the side opposite one of the shoulders by a prehension zone forming a hollow emptying into the cavity.

One of the shoulders may cover a zone of the cavity, the dimension of which zone is less than 5% of the diameter of the disk.

One of the shoulders is advantageously formed by a radial prolongation covering part of the cavity over a distance less than 5% of the diameter of the disk.

One of the shoulders may be constituted of a rocking element with a flange with a thickness corresponding to the thickness of the disk, which element can be moved between a position in which it holds the disk in the cavity and a position in which it releases the disk.

One of the shoulders may also have an elastically deformable bottom during the insertion phase of the disk.

The package may also comprise at least one second plate for housing at least one second disk, which second plate has at least two radial shoulders defined so as to cover at rest a marginal zone of the disk and to define with the bottom of the plate a slot with a height approximately equal to the disk thickness. These shoulders are configured in such a manner as to allow the introduction and withdrawal of the disk by elastic deformation of a part of the plate.

The second plate advantageously covers at least a part of the plate. The second plate preferably covers 50% of the plate cavity.

Figure 1:
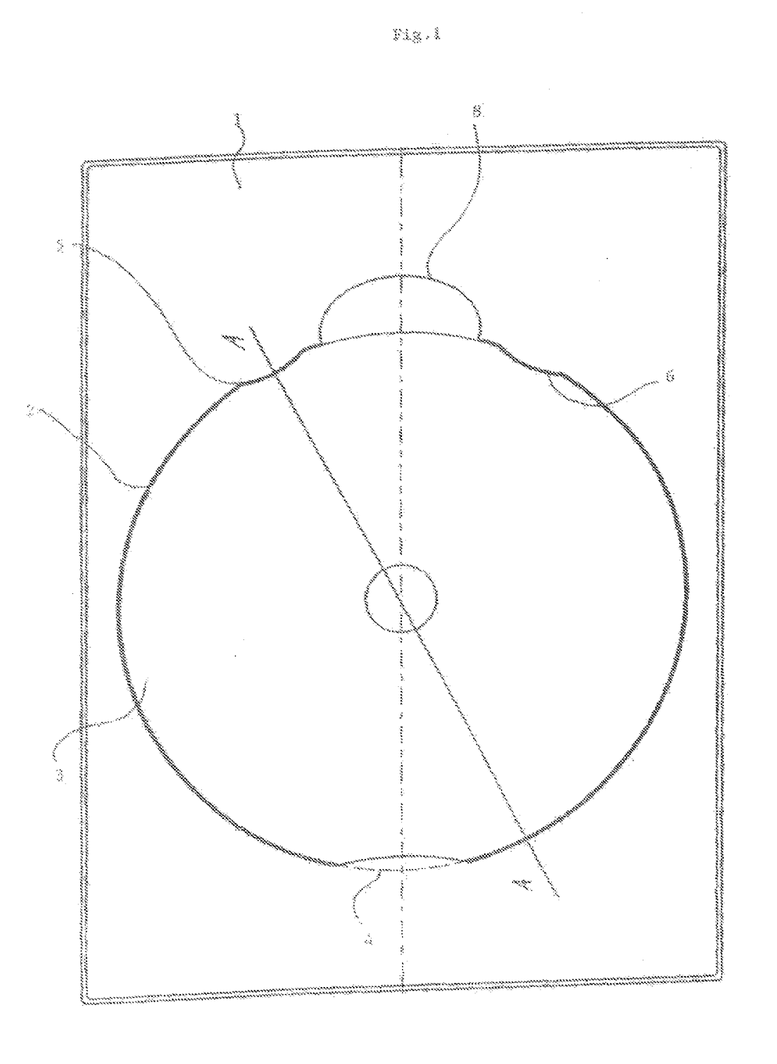
FIG. 1 is a top view showing an exemplary embodiment of the package in accordance with aspects of the invention.
Figure 2:
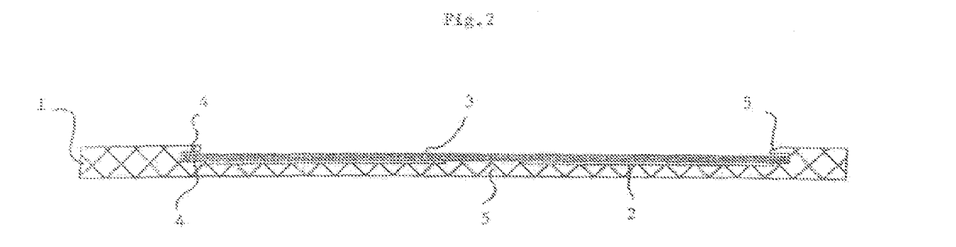
FIG. 2 is a section AA of the package of FIG. 1.
Figure 3:
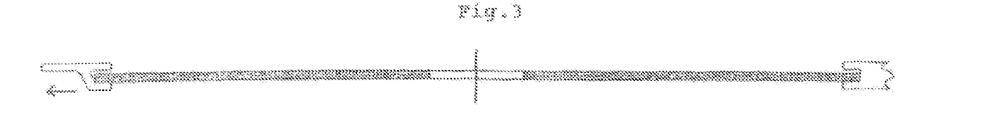
FIG. 3 is a sectional view of one structure of the package.

Turning now to the drawings, FIGS. 1, 2 and 3, respectively, show a top view and a section of an exemplary aspect of the structure and a section of another structure.

The package is constituted of a plate 1 with a housing with an approximately cylindrical shape for receiving a disk 3.

Plate 1 is made from plastic or any other material. It has a thickness greater than the thickness of disk 3. The housing is formed by cavity 2 with an annular border and central island 15. It is prolonged by prehension zone 8 with a width of approximately 20 mm that allows the edge of the disk 3 to be grasped by a finger.

The package has three shoulders 4 to 6 arranged on both sides of transversal median line 7.

Shoulder 4 is arranged transversally and extends out to cover a peripheral zone of cavity 2.

The two shoulders 5,6 are arranged symmetrically on both sides of prehension zone 8. The upper surface has a bevel that facilitates introduction of the disk.

They also cover a peripheral zone of cavity 2. Shoulders 4 to 6 cover the cavity over one to two millimeters to ensure an effective hold when disk 3 is in position and to ensure easy insertion and removal by elastic deformation of part of plate 1.

In a preferred aspect, the deformable part of plate 1 consists of an element forming a stop. This stop is advantageously a foot 16 with a convex shape and a width that slightly decreases between its ends and its central part.

Foot 16, fixed to plate 1 at the level of its ends, is arranged in the slot formed by shoulder 4 and the bottom of plate 1 in such a manner as to constitute a stop that deforms during the introduction and the removal of disk 3 and reassumes its initial shape once disk 3 is inserted or removed from cavity 2.

The feet and plate 1 may be constituted of plastic.

Figure 4:
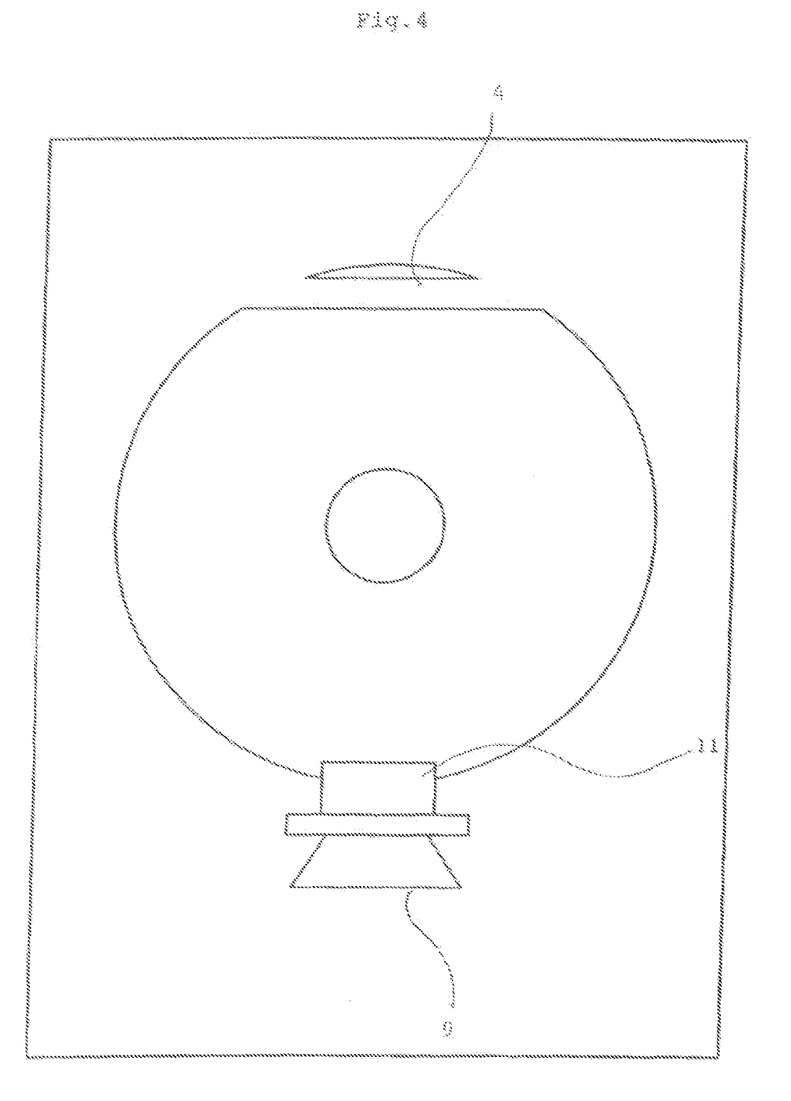
FIG. 4 is a top view of the package.
Figure 5:
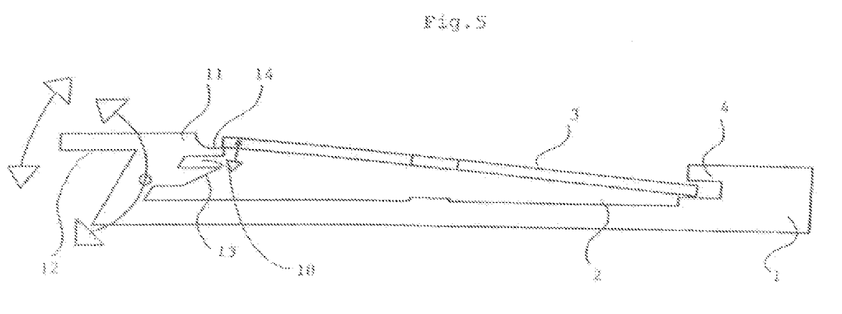
FIG. 5 is a sectional view of the structure shown in FIG. 4.

FIGS. 4, 5 show another aspect.

Figure 6:
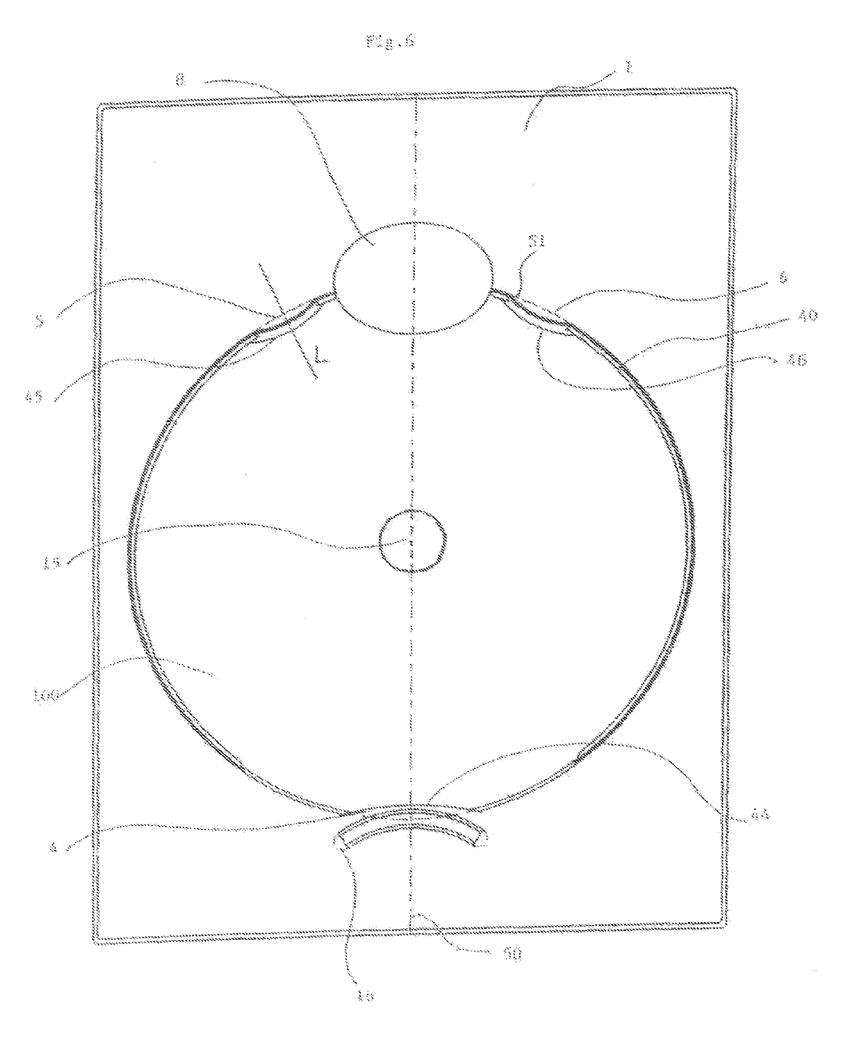
FIG. 6 is a top view of another structure.

FIG. 6 shows a top view of another aspect. The plate has a housing 2 whose length, measured along an axis passing through cavity 8, is greater than the nominal section of the disk intended to be housed in the housing. The housing can have a circular shape with a diameter slightly greater than the nominal diameter of a disk or can also have an oval shape with a width corresponding approximately to the diameter of a disk and a length greater than the diameter of the disk. The difference between the diameter of the disk and the length of the housing is sufficient to permit engagement of the disk into the housing, but reduced to permit a holding by shoulders 4, 5, 6.

Housing 2 receiving the disk comprises prolongation 8 for the passage of a finger. The plate comprises two lugs 5, 6 on both sides of the cavity and extending slightly above the housing in which the disk is housed by several millimeters. Lugs 5, 6 are located in the upper plane of the plate and delimit with the bottom of housing 2 a space whose height corresponds approximately to the width of a disk.

Plate 1 comprises transversal shoulder 4 and, on the diametrically opposite side, locking element 9 with flange 10 whose height corresponds approximately to the thickness of disk 3.

Locking element 9 is pivotably mounted, e.g., by elastic deformation of a zone with a peripheral cutout and a non-cutout zone forming a hinge.

It is prolonged by lever 12 that allows rocking during the insertion or the removal of disk 3.

The locking element has lower part 13 with a length less than upper part 12 of which the upper part is biased.

FIG. 6 shows a top view of another aspect. The plate has a housing 2 whose length, measured along an axis passing through cavity 8, is greater than the nominal section of the disk intended to be housed in the housing. The housing can have a circular shape with a diameter slightly greater than the nominal diameter of a disk or can also have an oval shape with a width corresponding approximately to the diameter of a disk and a length greater than the diameter of the disk. The difference between the diameter of the disk and the length of the housing is sufficient to permit engagement of the disk into the housing, but reduced to permit a holding by shoulders 4, 5, 6.

Housing 2 receiving the disk comprises prolongation 8 for the passage of a finger. The plate comprises two lugs 5, 6 on both sides of the cavity and extending slightly above the housing in which the disk is housed by several millimeters. Lugs 5, 6 are located in the upper plane of the plate and delimit with the bottom of housing 2 a space whose height corresponds approximately to the width of a disk.

On the opposite side of the cavity the plate comprises spring leaf 16 arranged on longitudinal axis 50 passing through cavity 8. This spring leaf 16 can be realized in various shapes and even be replaced by an elastically deformable element or by a spring. In the example described, it has the shape of an arced concaved leaf penetrating at rest into the space provided for containing the disk.

It is covered by a lug 4 situated in the upper plane of the plate. Lug 4 defines, like lugs 5, 6, a space whose height corresponds approximately to the height of the disk.

The imaginary circle 40 passing respectively through zones 44, 45, 46 of spurs 4, 5, 6, that are the closest to center 15 of the housing, has a section less than the nominal section of a disk intended to be positioned in housing 2. The difference between the section of this virtual circle 40 and the nominal section of a disk corresponds approximately to the radial length L of a lug and to the amplitude of the deformation of elastic leaf 16 measured along longitudinal axis 50.

The two lugs 5,6 are arranged symmetrically on both sides of longitudinal axis 50 passing through the center of cavity 21 for the passage of a finger.

The plate is formed by molding or thermoforming a sheet of plastic. It can be adhered on a cardboard support or in a sleeve or also on the back of a book.

The disk can be introduced manually or automatically with equipment that facilitates insertion of the disk onto the plate with an initial angle of several degrees.

Introduction is performed by sliding the edge of the disk under lug 4. The disk is introduced with a slight inclination relative to the plate to achieve this.

By pushing the disk against leaf 16, the disk can be made to continue sliding under lug 4, then come to rest against the bottom of housing 2.

When the disk is then released, spring leaf 16 pushes it back towards the opposite edge and the edge of the disk is then lodged under lugs 5, 6 and is stopped against peripheral edge 51 of housing 2.

The disk is then held in the housing by edges 44, 45, 46 of the three lugs 4, 5, 6.

A finger is engaged into cavity 8 to remove it from the housing.

It is then possible to push the disk back toward spring leaf 16, which has the effect of releasing the upper edge of lugs 5, 6. A lever effect is exerted on the upper edge of the disk by the finger introduced into the cavity and it is made to assume an angle relative to the plane of the plate, which allows it to be disengaged from lugs 5, 6. The disk can then be withdrawn by sliding along longitudinal axis 50 until it is released from lower lug 4.

These movements are, of course, slight, on the order of several millimeters.

Another aspect is described with reference to FIGS. 7 to 10, respectively, showing a top view and sectional views on an enlarged scale.

Figure 7:
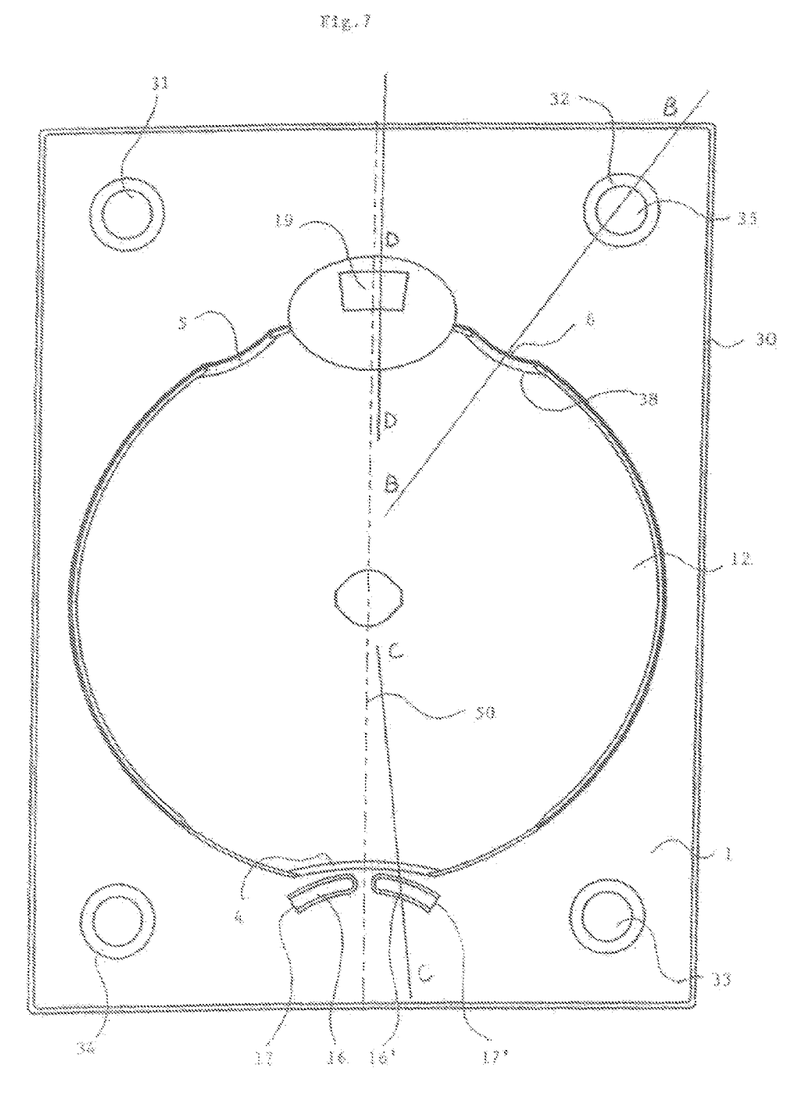
FIG. 7 is a top view of yet another structure.

Plate 1 is formed by molding or optionally by thermoforming a transparent plastic. It has a cavity 2 intended to receive a disk, as in the previous examples. This cavity is oval-shaped and lengthened along axis 50 passing through housing 8 for the passage of a finger.

The plate has edge 30 forming a peripheral frame. It contributes to the rigidity of the plate by limiting deformations by torsion and thus allows the thickness of plate 1 to be reduced.

Figure 8:
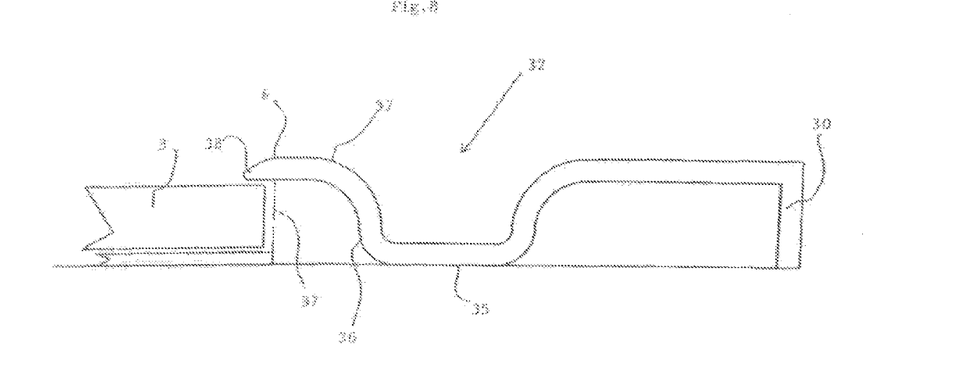
FIGS. 8 to 10 are detailed views along sectional planes BB, CC and DD, respectively.
Figure 9:
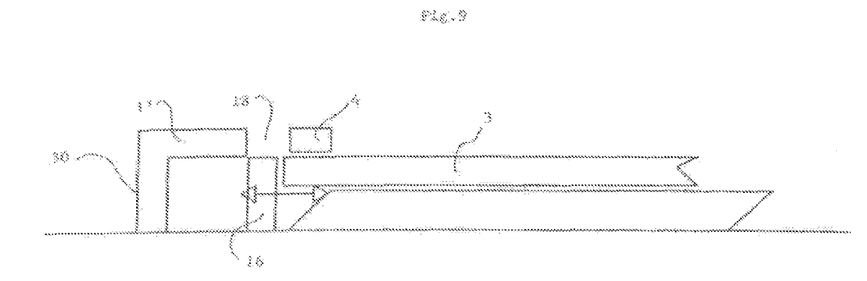
Figure 10:
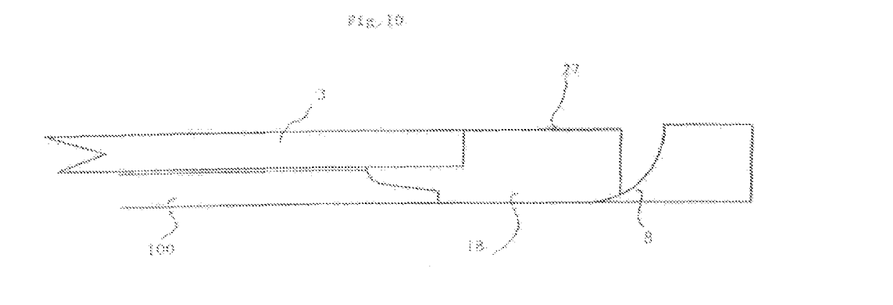

It also has four zones 31 to 34 for adhering the plate onto a cardboard leaf or a case. FIG. 8 shows an enlarged view in section along a plane passing through one of these adhesion zones.

Adhesion zones 31 to 34 have a hemispherical shape with a flat bottom 35 and flared peripheral edge 36 ending tangentially in the plane of upper surface 37 of plate 1.

This hemispherical shape with a flat bottom permits adhesion with a film of transparent adhesive spreading out perfectly on the junction surface between the plate and the cardboard support and allows the visibility of information written on the cardboard support to be retained.

Shoulder 6 extends approximately 1 millimeter over perimeter 37 of the housing of disk 3. It has, viewed from above, an arced shape with chamfered edge 38.

Disk 3 is held on the edge opposite the two shoulders 5, 6 by shoulder 4 that also has, viewed from above, an arced shape. Moreover, disk 3 comes to rest against the spring leaf of elastically formed by two deformable segments 16, 16' integral with plate 1 at their ends 17, 17'. Plate 1 has a cutout 18 that releases the two segments 16, 16' and permits a deflection by flexing around fixation zone 17, 17' by elastic deformation of the two segments 16, 16'.

The plate has a cavity 8 opposite the spring leaf realized by a local reduction of the thickness of plate 1 and an optional window 19 that permits the deeper engagement of the finger under disk 3. The shape of cavity 8 is oval. The bottom 100 of plate 1 can optionally have an opening to reduce the amount of plastic and to impart a particular aesthetic aspect.

The plate has a cavity 8 opposite this spring leaf realized by a local reduction of the thickness of plate 1 and an optional window 19 that permits the deeper engagement of the finger under disk 3. The shape of this cavity 8 is oval. The bottom 100 of plate 1 can optionally have an opening to reduce the amount of plastic and to impart a particular aesthetic aspect.

In a particular embodiment the plate comprises foot 27 connected in a breakable manner to the plate. This breakable foot 27 covers part of cavity 8 as well as the edge of disk 3 before the first opening. The foot 27 may have a slightly decreasing width between ends and a central part thereof.

At purchase, breakable foot 27 is broken and a finger can then be introduced into cavity 8 and push disk 3 toward spring leaf 16 to release it from the plate. The foot can have different shapes and be connected either to a zone of cavity 8 or prolong the upper part of plate 1 in the vicinity of cavity 8.

Figure 11:
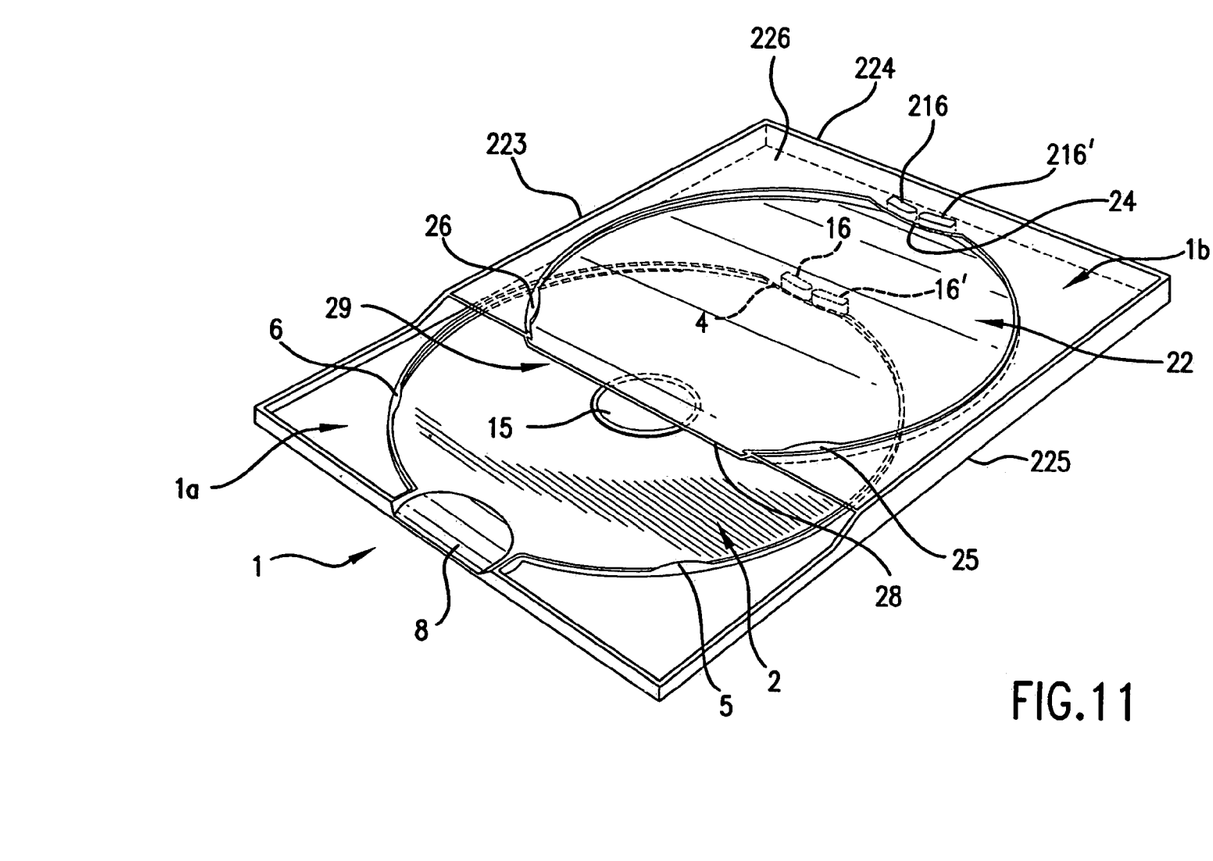
FIG. 11 is a perspective view of another example of a package for two digital recording supports.

FIG. 11 shows another aspect of a package that allows two information supports of the type like disk 3 to be packaged.

The package is constituted of a plate 1 with two support zones 1a, 1b for stacked disks. Each of support zones 1a, 1b has a housing for receiving a disk.

The housing of support zone 1a for receiving a first disk has an approximately cylindrical shape and a thickness greater than the thickness of the disk.

The housing of support zone 1a is formed by a cavity 2 with an annular edge and a central island 15. It is prolonged by prehension zone 8 that allows the edge of the first disk to be grasped with a finger.

Support zone 1a has three radial shoulders 4 to 6 covering a peripheral part of cavity 2 on the order of one to two millimeters. Shoulders 5, 6 are advantageously arranged symmetrically on both sides of prehension zone 8 and shoulder 4 is formed on the edge of this support zone 1a opposite this prehension zone 8.

This support zone 1a also has an elastically deformable zone consisting of an element forming a stop. The stop is advantageously formed by two convexly shaped segments 16, 16'.

Thus, as a result of this configuration the first disk is not only held effectively in cavity 2 by shoulders 4 to 6, but is also readily inserted and removed from cavity 2 by virtue of deformable segments 16, 16' constituting support zone 1a of plate 1.

The second support zone 1b also has a housing for receiving at least part of a second disk.

The second support zone has two lateral walls 223, 225, a rear wall 224 and an upper wall 226 on which the housing for receiving the second disk is formed. Second plate 21 advantageously has a thickness greater than the thickness of the second disk.

The housing consists of a cavity 22 comprising a bottom in the form of a circle provided with cutout line 28 and an annular wall running along at least part of the bottom in such a manner that an opening 29 is formed on the front face of the second support zone 1b.

Thus, when the disk is positioned in cavity 22 of second support zone 1b, the disk has a more a less significant part along opening 29 formed on the front face of support zone 1b extending outside of cavity 22. The free part of the disk then allows it to be manipulated in an advantageous manner, particularly during its withdrawal from cavity 22.

Although not shown in FIG. 11, cavity 22 can also have a central island 215.

Just like the first support zone 1*a*, the second support zone 1*b* has three radial shoulders 24 to 26 covering a peripheral zone of cavity 22 on the order of one to two millimeters. Shoulders 25, 26 are advantageously arranged symmetrically on both sides of cutout line 28 and shoulder 24 is formed on the edge of support zone 1*b* opposite this cutout line 28.

Just like the first support zone 1*a*, the second support zone 1*b* is constituted of a deformable part consisting of two convex segments 216, 216'.

Thus, when a disk is inserted into cavity 22 of second support zone 1*b*, the disk exerts a pressure on segments 216, 216' that deform under this action to permit insertion of the disk into cavity 22. The disk is then firmly held in cavity 22 by shoulders 24 to 26 and segments 216, 216' that have reassumed their initial position. The removal of the disk from cavity 22 is made by pushing on the part of the disk that extends out of cavity 22 in the direction of said segments 216, 216' that deform under the action of the disk to permit removal of the disk from cavity 22 of second support zone 1*b*.

Second support zone 1*b* is advantageously arranged on support zone 1*a* in such a manner as to partially cover first support zone 1*a* and, more specifically, a part of cavity 2 of first support zone 1*a*. The second support zone 1*b* may cover at least 50% of cavity 2 of first support zone 1*a*.

On the other hand, second support zone 1*b* is arranged on first support zone 1*a* in such a manner that rear wall 224 and lateral walls 223, 225 correspond approximately to an extension of the rear wall and at least in part of the lateral walls of first support zone 1*a*.1

On the other hand, second support zone 1*b* is arranged on first support zone 1*a* in such manner as to allow sufficient space between the bottom of second support zone 1*b* and the bottom of cavity 2 of first plate 1 for insertion and removal of the first disk into first support zone 1*a*. In fact, during the operation of inserting the disk into cavity 2 the first disk should be able to be slid into cavity 2 of first support zone 1*a* with a slight inclination. Likewise, during the removal of the disk from cavity 2 the disk should be able to be given an inclination sufficient to allow it to disengage from shoulders 5, 6 constituting first support zone 1*a*.

The arrangement of the first and second support zones 1*a*, 1*b* thus makes possible insertion and removal of the first and second disks independently of one another. In other words, removal (e.g.) of the first disk from cavity 2 of the first support zone 1*a* with a package does not require, in distinction to the packages known in the art, removal of the second disk arranged in cavity 22 of second support zone 1*b* and inversely.

Figure 12:
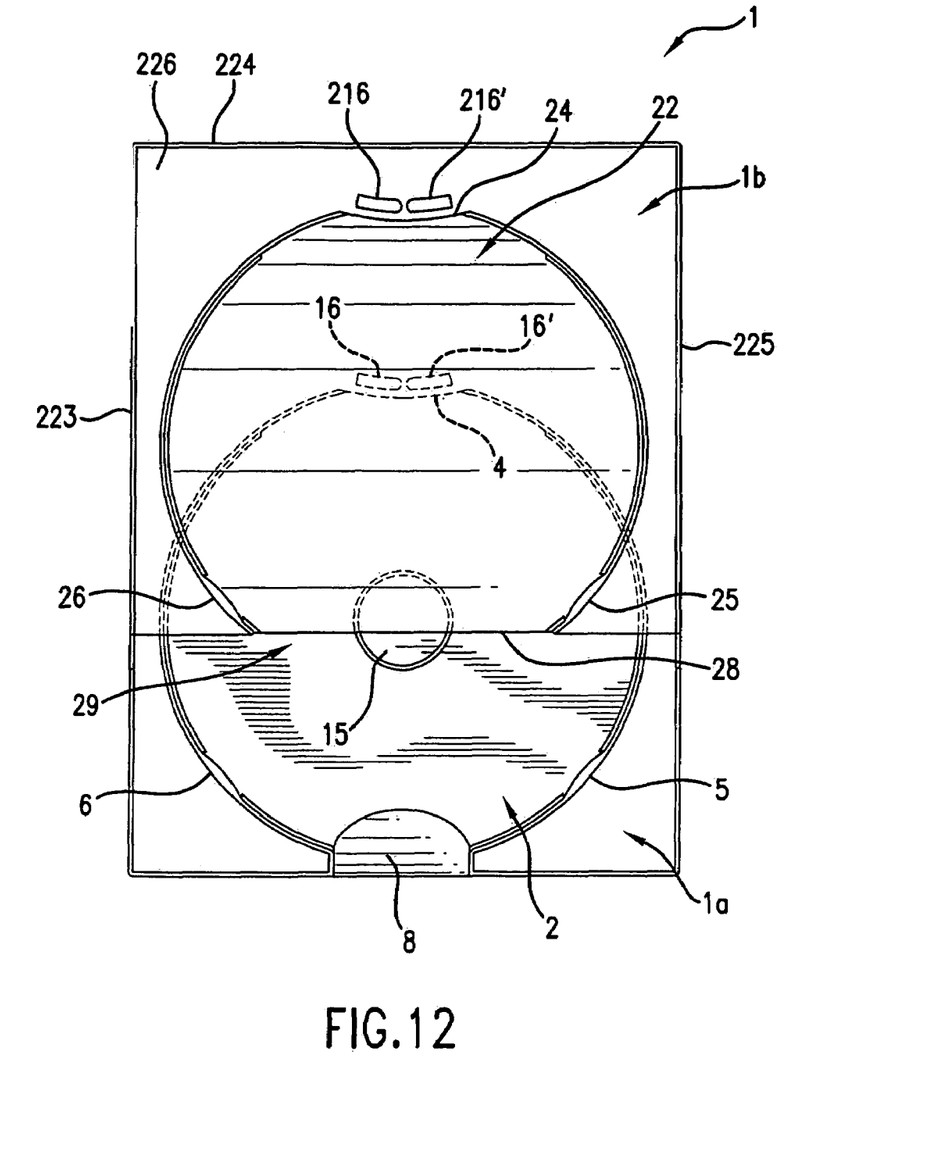
FIG. 12 is a top view of the package of FIG. 11.

FIG. 12 shows a top view of the package constituted of plates 1, 21.

Second support zone 1*b* is arranged on first support zone 1*a* in such a manner that shoulders 24 to 26 are arranged in alignment with shoulders 4 to 6, respectively, of first zone 1*a* and that opening 29 of cavity 22 on the front face of second support zone 1*b* is directed toward prehension zone 8 of first support zone 1*a*.

Even though FIGS. 11, 12 illustrate a package provided with two support zones 1*a*, 1*b* stacked for receiving two disks, it is understood that an expert in the art can conceive of packages comprising a plurality of stacked support zones arranged relative to each other in such a manner as to permit the packaging of a plurality of disks without departing from the scope of the invention.

Figure 13:
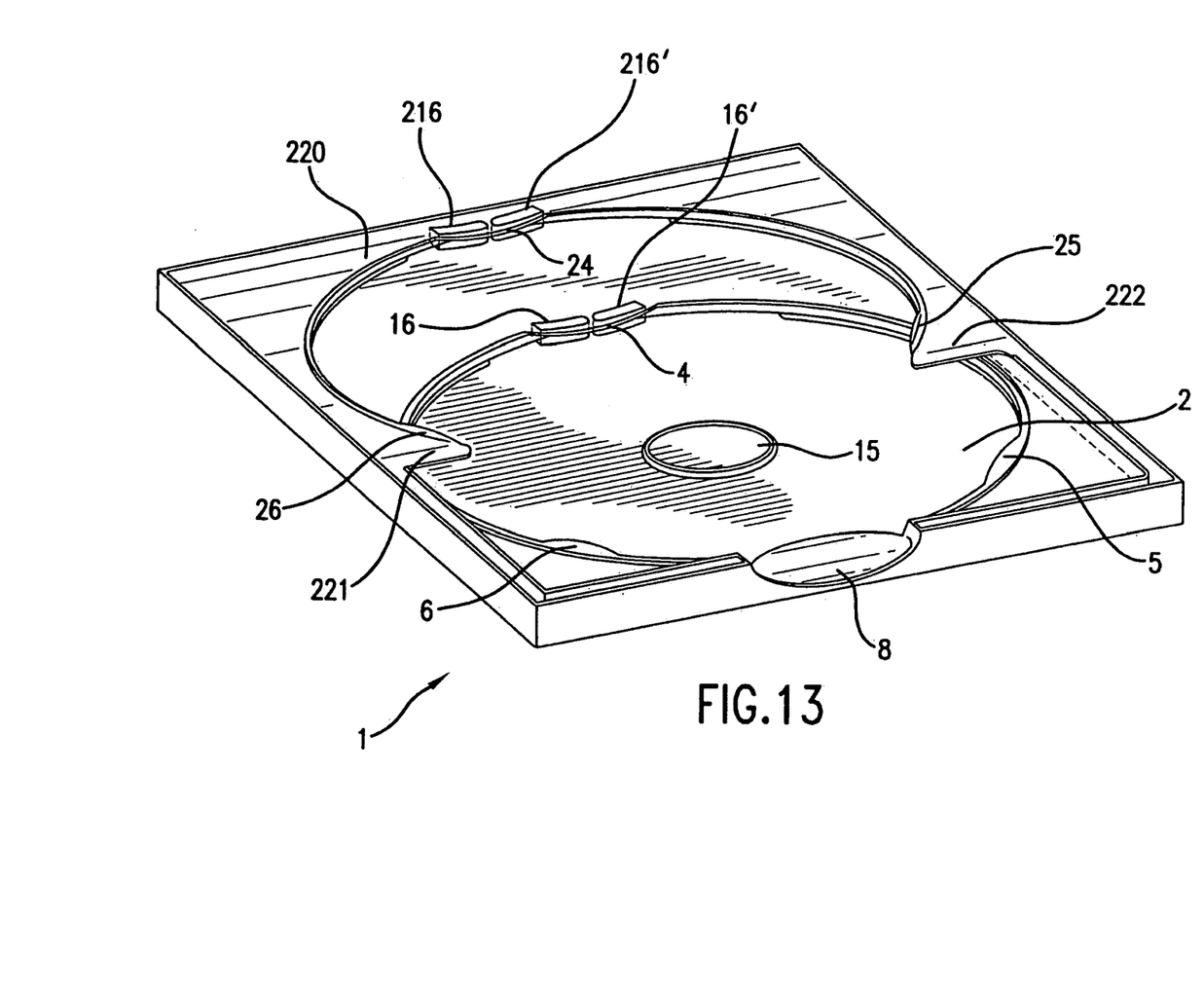
FIGS. 13 to 15, respectively, are a front view in perspective, a rear view in perspective and a top view of another structure for two digital recording supports.
Figure 14:
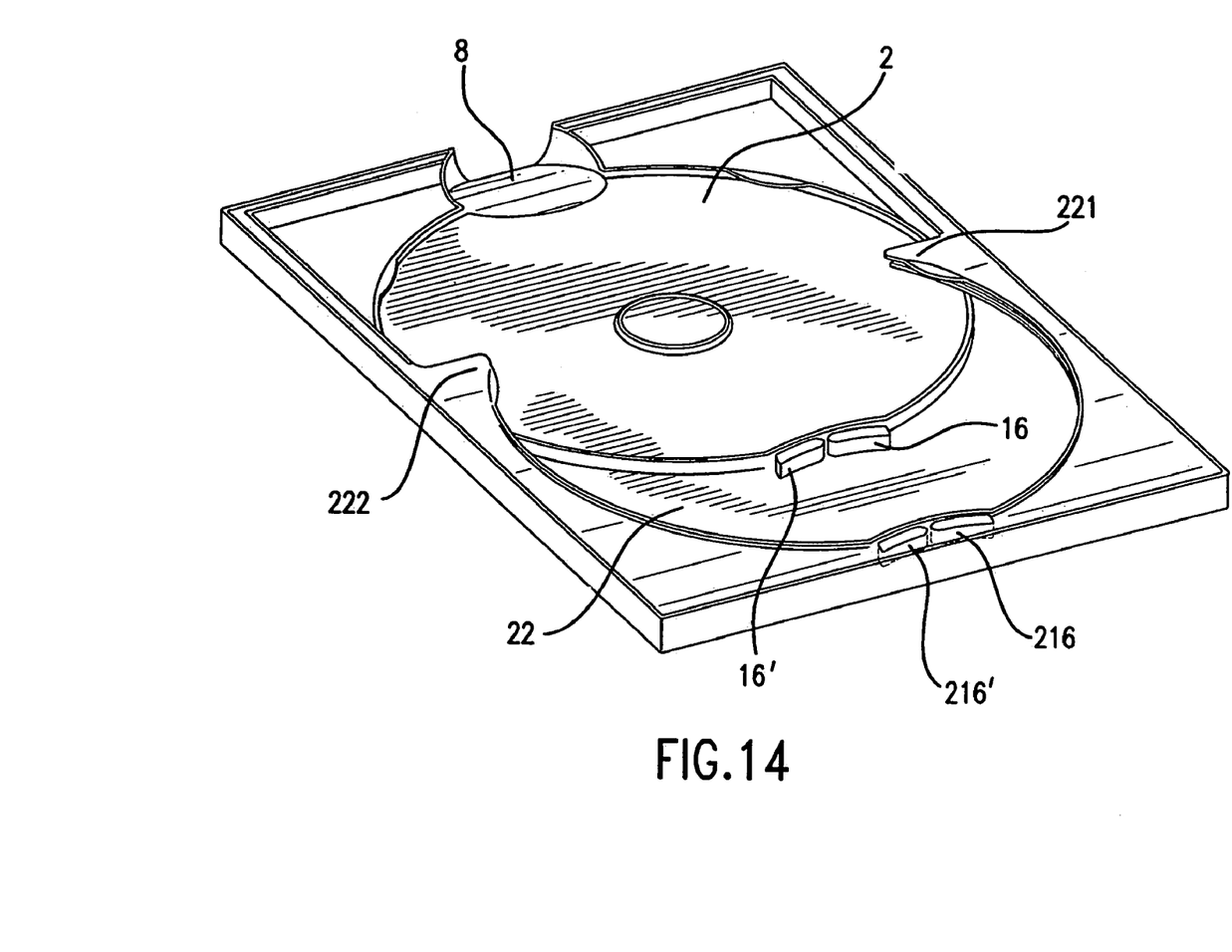
Figure 15:
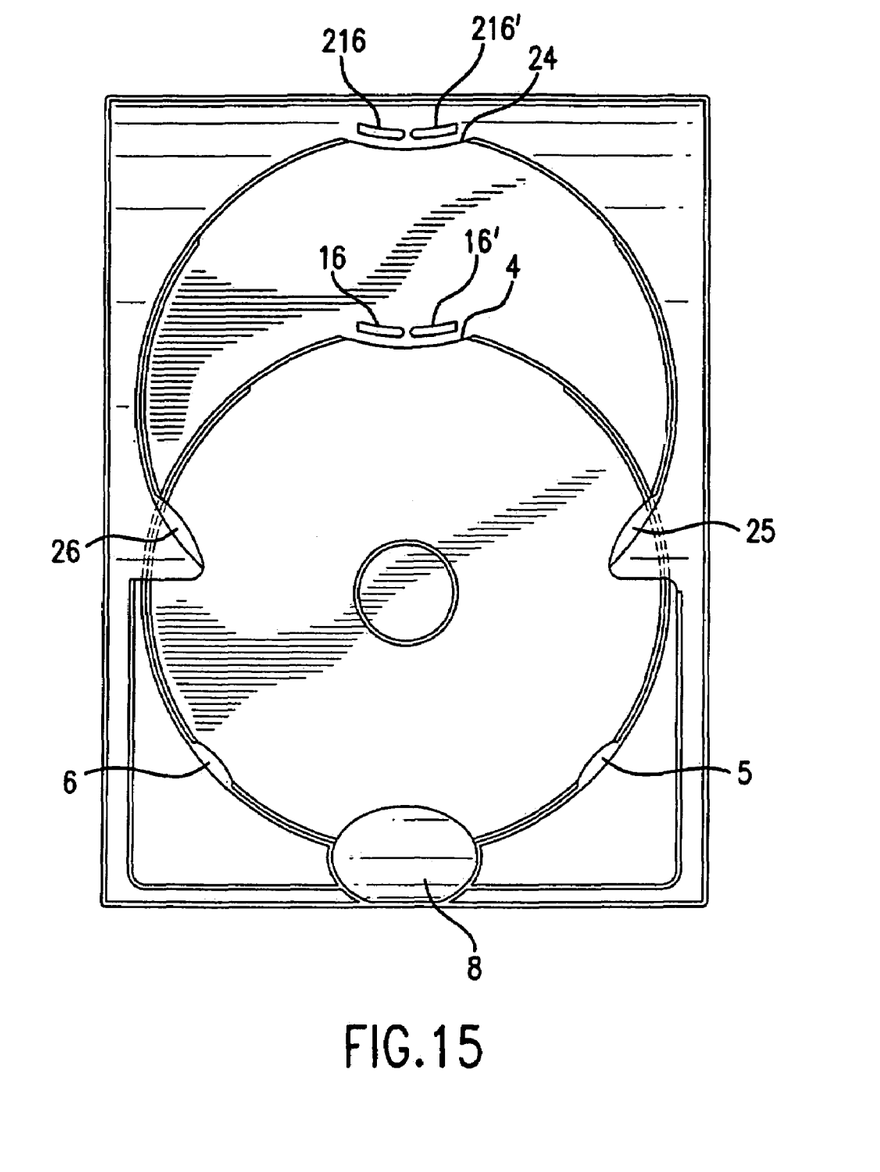

FIGS. 13 to 15 show another exemplary embodiment of a package for two digital recording supports of the disk type.

The package is constituted of plate 1 with two housings, a lower housing and an upper housing, each for receiving a disk. By virtue of this fact, plate 1 has a thickness greater than the thickness of two disks.

The lower housing is advantageously cylindrical to receive a first disk. More particularly, the lower housing consists of cavity 2 with an annular edge and central island 15.

As described above, cavity 2 comprises on its periphery radial shoulders 4 to 6 and segments 16, 16' forming an elastically deformable stop element.

As for the upper housing, it consists of cavity 21 in the form of a crescent moon provided on its external periphery with edge 220 and whose ends 221, 222 extend above lower cavity 2.

Figure 16:
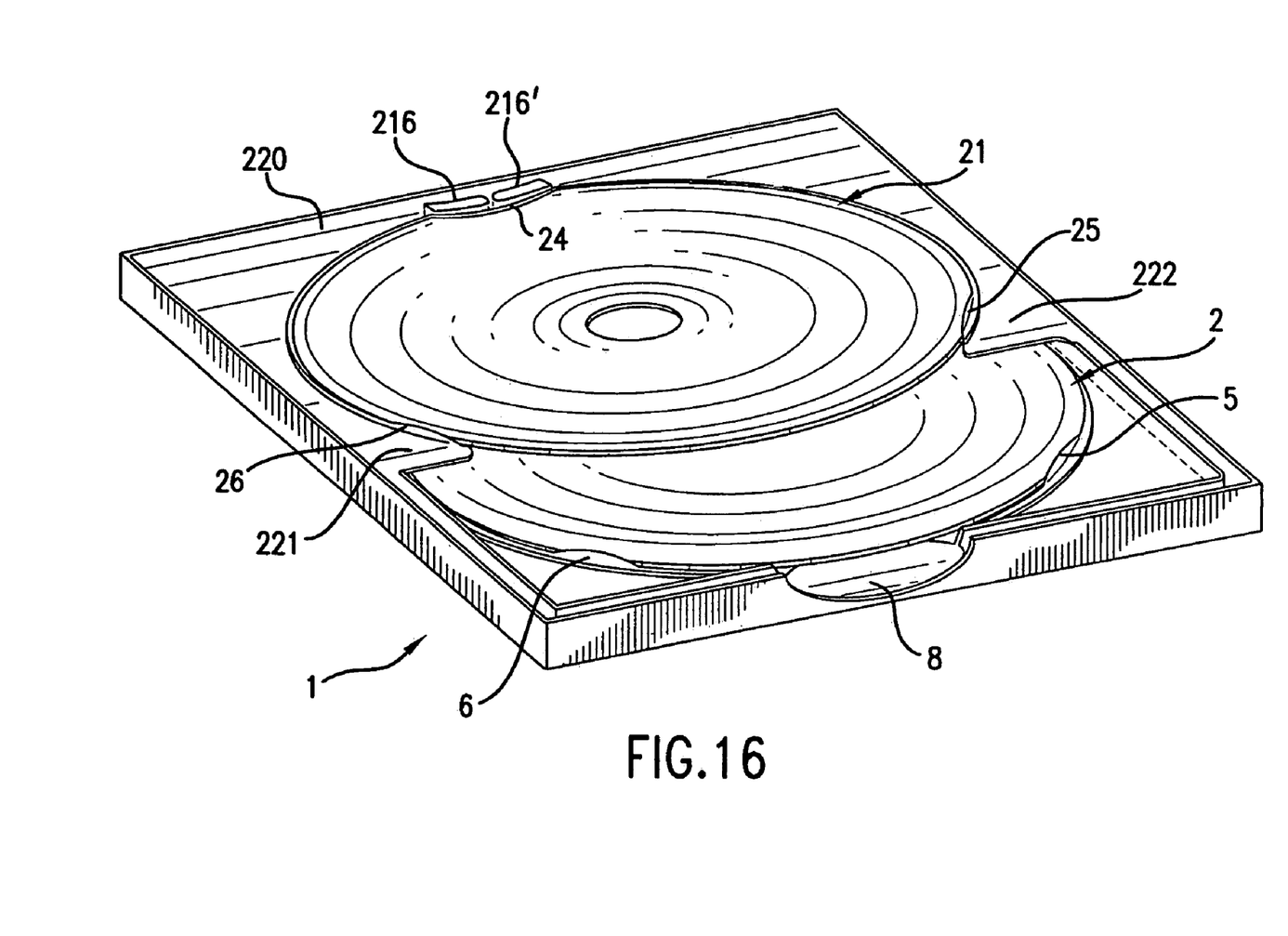
FIG. 16 is a perspective view of the package of FIGS. 13 to 15 in which the digital recording supports are arranged in the package.

Thus, when the second disk is positioned in upper cavity 22, the disk has a part extending above lower cavity 2, or, when the package comprises the two disks, above the lower disk as illustrated in FIG. 16. Just as for lower cavity 2, this cavity 22 comprises on its periphery radial shoulders 24 to 26 and segments 216, 216' forming an elastically deformable stop element.

Just as described above, it is understood that one skilled in the art can conceive of packages comprising a plurality of cavities arranged relative to each other in such a manner as to permit the packaging of a plurality of disks without departing from the scope of the invention.

Although this disclosure has been described in connection with specific forms thereof, it will be appreciated that a wide variety of equivalents may be substituted for the specified elements described herein without departing from the spirit and scope of the disclosure as described in the appended claims.

The invention claimed is:

1. A package for a digital recording support in the form of a disk, the package comprising a plate with a disk centering piece and a bottom, wherein the plate has a cylindrical cavity for receiving the disk, the cylindrical cavity comprising at least two radial shoulders defined to cover, when at rest, a marginal zone of the disk and define, with the bottom, a slot with a height approximately equal to the thickness of the disk, the cylindrical cavity prolonged from a side opposite one of the shoulders by a prehension zone forming a hollow portion in communication with the cylindrical cavity, wherein the plate has at least one elastically deformable stop arranged on the periphery of the cavity comprising at least one foot having a convex shape directed toward the cylindrical cavity; and a window within the prehension zone that allows a deeper engagement of a finger under the disk.

2. The package according to claim 1, wherein the cylindrical cavity has a diameter greater than the diameter of the disk.

3. The package according to claim 1, wherein the cylindrical cavity has an oval shape with a large axis greater than the diameter of the disk and a small axis corresponding approximately to the diameter of the disk.

4. The package according to claim 3, wherein the at least one stop is arranged at the level of the slot formed by one of the shoulders and the bottom of the plate.

5. The package according to claim 3, wherein the at least one stop is supported by one of the shoulders.

6. The package according to claim 3, wherein the at least one foot has a slightly decreasing width between ends and a central part thereof.

7. The package according to claim 1, wherein the cylindrical cavity comprises an annular peripheral band and the shoulders are arranged to form with the annular band an engagement groove corresponding approximately to the thickness of the disk.

8. The package according to claim 1, wherein one of the shoulders covers a zone of the cavity, the dimension of which zone is less than 5% of the diameter of the disk.

9. The package according to claim 1, wherein one of the shoulders is formed by a radial prolongation covering part of the cavity over a distance less than 5% of the diameter of the disk.

10. The package according to claim 1, wherein one of the shoulders has an elastically deformable bottom during an insertion phase of the disk.

11. The package according to claim 1, wherein an edge of the cavity has at least one lug extending several tenths of a millimeter above the cylindrical cavity and wherein the at least one stop has an elastically deformable depth.

12. The package according to claim 1, wherein the cylindrical cavity has a peripheral edge defining with the shoulders a slot with a height corresponding to the thickness of the disk, and has a central, annular island.

13. The package according to claim 1, wherein the plate further comprises at least one complementary cavity for receiving at least one complementary disk, each at least one cavity comprising at least two radial shoulders on a periphery defined to cover when at rest a marginal zone of a corresponding complementary disk and define with a bottom portion of the cavity a slot with a height approximately equal to the thickness of the corresponding complementary disk, which shoulders are configured to permit introduction and removal of the disk by elastic deformation of a part of the plate.

14. The package according to claim 1, wherein a portion of the prehension zone extends into the cylindrical cavity.

* * * * *